United States Patent
Cowley et al.

(10) Patent No.: US 9,491,018 B2
(45) Date of Patent: Nov. 8, 2016

(54) CARRIER PHASE AND AMPLITUDE ESTIMATION FOR PHASE SHIFT KEYING USING PILOTS AND DATA

(71) Applicant: UNIVERSITY OF SOUTH AUSTRALIA, Adelaide (AU)

(72) Inventors: William George Cowley, Adelaide (AU); Robert George McKilliam, Adelaide (AU); Andre Polok, Adelaide (AU)

(73) Assignee: University of South Australia, Adelaide, South Australia (AU)

( * ) Notice: Subject to any disclaimer, the term of this patent is extended or adjusted under 35 U.S.C. 154(b) by 0 days.

(21) Appl. No.: 14/651,941

(22) PCT Filed: Dec. 13, 2013

(86) PCT No.: PCT/AU2013/001464
§ 371 (c)(1),
(2) Date: Jun. 12, 2015

(87) PCT Pub. No.: WO2014/089634
PCT Pub. Date: Jun. 19, 2014

(65) Prior Publication Data
US 2015/0312073 A1    Oct. 29, 2015

(30) Foreign Application Priority Data
Dec. 14, 2012  (AU) ................................ 2012905489

(51) Int. Cl.
*H03D 3/22* (2006.01)
*H04L 27/22* (2006.01)
(Continued)

(52) U.S. Cl.
CPC .......... *H04L 27/2271* (2013.01); *H04L 5/006* (2013.01); *H04L 27/2275* (2013.01);
(Continued)

(58) Field of Classification Search
CPC ... H04L 27/2271; H04L 27/18; H04L 5/006; H04L 27/38; H04L 27/2275; H04L 2025/03401; H04L 2025/03649; H04L 27/2332

USPC ........ 375/329, 340, 341, 279; 329/304, 306, 329/307
See application file for complete search history.

(56) References Cited

U.S. PATENT DOCUMENTS

2008/0008268 A1*  1/2008  Koc .................... H04L 27/0014
375/329

FOREIGN PATENT DOCUMENTS

WO          WO 98/49767         11/1998

OTHER PUBLICATIONS

Cowley, W. G., "Reference symbols can improve performance over differential coding in ML and near-ML detectors", Signal Processing, Nov. 1998, pp. 95-99, vol. 71, No. 1.
(Continued)

*Primary Examiner* — Phuong Phu
(74) *Attorney, Agent, or Firm* — McDonnell Boehnen Hulbert & Berghoff LLP

(57) ABSTRACT

A least squares estimator of carrier phase and amplitude in a receiver in a communication system using a phase shift keying modulation scheme that uses both known pilot symbols and unknown data symbols is described. That is, the method exploits knowledge of pilot symbols in addition to the unknown data symbols to estimate carrier phase and amplitude. Further, an efficient recursion based estimation method is described that only requires O(L. log L) arithmetic operations where L is the number of received signals. This method uses the M-Ary rounded phase offsets to sort the data symbols and this sorted order is used to recursively calculate candidate values in an optimization process. Simulation results show that the estimation methods Using data and pilot symbols outperform estimation methods using only data symbols (ie non-coherent detection methods). Further, the system can be used for systems using multiple M-ary phase shift keying digital modulation schemes.

15 Claims, 5 Drawing Sheets

(51) Int. Cl.
*H04L 27/227* (2006.01)
*H04L 5/00* (2006.01)
*H04L 27/38* (2006.01)
*H04L 27/233* (2006.01)
*H04L 27/18* (2006.01)
*H04L 25/03* (2006.01)

(52) U.S. Cl.
CPC ............ *H04L 27/2332* (2013.01); *H04L 27/38* (2013.01); *H04L 27/18* (2013.01); *H04L 2025/03401* (2013.01); *H04L 2025/03649* (2013.01)

(56) References Cited

OTHER PUBLICATIONS

Divsalar et al., "Multi-Symbol Differential Detection of MPSK", IEEE Trans. Commun., Mar. 1990, pp. 300-308, vol. 38, No. 3.

Liu, Jian et al., "An Analysis of the MPSK Scheme with Differential Recursive Detection (DRD)," Proc. IEEE Conf. on Veh. Tech., May 1991, pp. 741-746.

MacKenthun, Kenneth M., Jr., "A Fast Algorithm for Multiple-Symbol Differential Detection of MPSK", IEEE Trans. Commun., Feb./Mar./Apr. 1994, pp. 1471-1474, vol. 42, No. 2/3/4.

Makrakis et al., "Optimal Noncoherent Detection of PSK Signals", Electronics Letters, Mar. 1990, pp. 398-400, vol. 26, No. 6.

McKilliam et al., "Linear-Time Block Noncoherent Detection of PSK", Proc. Internat. Conf. Acoust. Spe.Sig. Process., Apr. 2009, pp. 2465-2468.

Sweldens, Wim, "Fast Block Noncoherent Decoding", IEEE Comms. Letters, vol. 5, No. 4, pp. 132-134, Apr. 2001.

Viterbi et al., "Nonlinear Estimation of PSK-Modulated Carrier Phase with Application to Burst Digital Transmission", IEEE Trans. Inform. Theory, Jul. 1983, pp. 543-551, vol. 29, No. 4.

Wilson et al., "Multi-Symbol Detection of MPSK", Proc. IEEE GLOBECOM, Nov. 1989, pp. 1692-1697.

* cited by examiner

CARRIER PHASE AND AMPLITUDE ESTIMATION FOR PHASE SHIFT KEYING USING PILOTS AND DATA

CROSS-REFERENCE TO RELATED APPLICATIONS

The present application is a U.S. National Phase Application pursuant to 35 U.S.C. §371 of International Application No. PCT/AU2013/001464 filed Dec. 13, 2013, which claims priority to Australian Provisional Patent Application No. 2012905489 filed Dec. 14, 2012. The entire disclosure contents of these applications are herewith incorporated by reference into the present application.

PRIORITY DOCUMENT

The present application claims priority from Australian. Provisional Patent Application No 2012905489 titled "CARRIER PHASE AND AMPLITUDE ESTIMATION FOR PHASE SHIFT KEYING USING PILOTS AND DATA" filed on 14 Dec. 2012; the content of which is hereby incorporated by reference in its entirety.

INCORPORATION BY REFERENCE

The following co-pending PCT applications are referred to in the following description:
PCT/AUAU2013/000888 titled "System for Analog to Digital Conversion" filed on 13 Aug. 2013;
PCT/AU2013/000895 titled "Channel. Allocation in a Communication System" filed on 14 Aug. 2013;
PCT/AU2013/001078 titled "Communication system and method" filed on 20 Sep. 2013; and
PCT/AU2013/001079 titled "Multi-access Communication System" filed on 20 Sep. 2013. The content of each of these applications is hereby incorporated by reference in their entirety.

TECHNICAL FIELD

The present invention relates to communication systems. In a particular form the present invention relates to estimation of carrier phase and amplitude in a receiver in a communication system using a phase shift keying modulation scheme.

BACKGROUND

In a passband communication system the transmitted signal typically undergoes time offset (delay), phase shift and attenuation (amplitude change). These effects must be compensated for at the receiver, and the performance of the receiver can depend greatly on the accuracy of the estimates of these parameters. In the present case, we assume that the time offset has been previously handled and we focus on the problem of estimating the phase shift and attenuation of the signal at the receiver. We consider signalling constellations that have symbols evenly distributed on the complex unit circle, such as, binary phase shift keying (BPSK), quaternary phase shift keying (QPSK) and M⁻-ary phase shift keying (M-PSK). In this case, the transmitted symbols take the form:

$$s_i = e^{ju_i}, \quad (1)$$

where $j = \sqrt{-1}$ and $u_i$ is from the set $$\left\{0, \frac{2\pi}{M}, \ldots, \frac{2\pi(M-1)}{M}\right\}$$

and $M \geq 2$ is the size of the constellation. We assume that some of the transmitted symbols are pilot symbols known to the receiver and the remainder are information carrying data symbols with phase that is unknown to the receiver. So, $$s_i \begin{cases} p_i & i \in P \\ d_i & i \in D \end{cases}, \quad (2)$$

where P is the set of indices describing the position of the pilot symbols $p_i$, and D is a set of indices describing the position of the data symbols $d_i$. The sets P and D are disjoint, ie $P \cap D = \emptyset$, and $L = |P \cup D|$ is the total number of symbols transmitted.

We assume that time offset estimation has been performed and that L noisy M-PSK symbols are observed (received) by the receiver. The received signal is then, $$y_i = a_0 s_i + w_i, i \in P \cup D, \quad (3)$$

where $w_i$ is noise and $a_0 = \rho_0 e^{j\theta_0}$ is a complex number representing both carrier phase $\theta_0$ and amplitude $\rho_0$ (by definition $\rho_0$ is a positive real number). Our aim is to estimate $a_0$ from the noisy symbols $\{y_i, i \in P \cup D\}$. Without loss of generality, the L noisy signals may form a block of symbols. The block may be an arbitrary number of symbols selected by the receiver or the size of the block may be determined based upon a communication system parameter such as a predetermined frame size. Complicating matters is that the data symbols $\{d_i, i \in D\}$ are not known to the receiver and must also be estimated. For the sake of clarity, we define a pilot symbol as a symbol which is known to the receiver and data symbols as symbols which are unknown to the receiver. Thus, data symbols which are known can be treated as pilot symbols in the discussion that follows.

One approach is the least squares estimator, that is, the minimisers of the sum of squares function $$SS(a, \{d_i, i \in D\}) = \sum_{i \in P \cup D} |y_i - as_i|^2 = \sum_{i \in P} |y_i - as_i|^2 + \sum_{i \in D} |y_i - ad_i|^2, \quad (4)$$

where $|x|$ denotes the magnitude of the complex number x. The least squares estimator is also the maximum likelihood estimator under the assumption that the noise sequence $\{w_i, i \in \mathbb{Z}\}$ is additive white and Gaussian. However, the estimator also works well under less stringent assumptions. The existing literature mostly considers what is called non-coherent detection where no pilot symbols exist (P=∅ where ∅ is the empty set). In the non-coherent setting differential encoding is often used and for this reason the estimation problem has been called multiple symbol differential detection. Differential detection comprises determining the difference between the received, phases of two consecutive symbols to determine the encoded phase. That is, the symbol is encoded based upon the change in phase in successive symbols, and thus, unlike the coherent case, the receiver does not need to estimate the carrier phase. A popular approach to multiple symbol differential detection is the so called non-data aided, sometimes also called nondecision directed, estimator based on the paper of Viterbi and Viterbi (A. Viterbi and A. Viterbi, "Nonlinear estimation of PSK-modulated carrier phase with application to burst digital transmission," *IEEE Trans. Inform. Theory*, vol. 29, no. 4, pp. 543-551, July 1983). The idea is to 'strip' the modulation from the received signal by taking $y_i/|y_i|$ to the power of M. A function $F: \mathbb{R} \mapsto \mathbb{R}$ is chosen, and the estimator of the carrier phase $\theta_0$ is taken to be $$\frac{1}{M} \angle A$$

where $\angle$ denotes the complex argument and $$A = \frac{1}{L} \sum_{i \in P \cup D} F(|y_i|) \left(\frac{y_i}{|y_i|}\right)^M. \tag{5}$$

Various choices for F are suggested in the Viterbi and Viterbi paper and a statistical analysis is presented. However, as this paper is only concerned with the non-coherent case, it is not obvious how the pilot symbols should be included in this method.

Thus, there is a need to provide an estimator for the carrier phase and amplitude in a received signal which includes both pilot symbols known to a receiver and data symbols unknown to a receiver, or at least to provide a useful alternative to existing estimation methods.

SUMMARY

According to a first aspect of the present invention, there is provided a method for estimating the carrier phase and amplitude in a received signal, the received signal comprising a plurality of symbols modulated using one or more M-ary phase shift keying digital modulation schemes, the plurality of symbols comprising a plurality of pilot symbols known to the receiver, and a plurality of data symbols unknown to the receiver, the method comprising:

calculating the M-ary rounded phase offset from the received signal for each of the received plurality of data symbols;

obtaining a sorted order of the data symbols, wherein the sorted order is determined using the M-ary rounded phase offsets;

calculating a plurality of candidate values of an objective function, wherein the objective function is optimised with respect to the carrier phase and amplitude, and each candidate value after a first candidate value is calculated recursively from the previous candidate value, wherein the order of the calculation is determined according to the sorted order of the data symbols; and determining the optimum value from the plurality of candidate values, and determining the carrier phase and amplitude associated with the optimum candidate value.

In one form, the plurality of symbols may be a block of symbols. The optimum value need not be a global optimum, and may simply be an optimum for the set of candidate estimates obtained.

In a further form, the sorted order is an ascending order of the M-ary rounded phase offsets.

In a further aspect, the objective function is a sum of squares function. In one aspect, the sum of squares function is minimised with respect to estimation of the carrier phase and amplitude.

In a further aspect, the number of modulation schemes is $|G|$ and $$H = \sum_{m \in G} m |D_m| = O(L)$$

candidate sum of squares values are calculated, where $|D_m|$ is the number of data symbols in the received signal modulated according to the $m^{th}$ modulation scheme and $D_m$ is the set of indices describing the positions of symbols modulated with the $m^{th}$ modulation scheme.

In a further aspect, the sum of squares value is a weighted sum of squares value.

In a further aspect, the weighting is based upon a Signal to Noise Ratio (SNR) to give more importance to pilot symbols when the SNR is low.

In a further aspect, the step of determining an optimum candidate value from the plurality of candidate values is performed as plurality of candidate values are calculated. In one aspect, as each candidate value is calculated it is compared with a current optimum candidate value, and if the calculated candidate value is optimal compared to the current optimum candidate value, the current optimum candidate value is updated with the calculated candidate value. In one aspect, if the current optimum candidate value is updated, a corresponding carrier phase and an amplitude value is calculated.

In a further aspect, the plurality of symbols are modulated using a single M-ary phase shift keying digital modulation scheme. In one aspect, the method implements the algorithm presented in Table 1 below.

In a further aspect, the plurality of symbols are modulated using two or more M-ary phase shift keying digital modulation schemes. In one aspect, the method implements the algorithm presented in Table 2 below.

According to a second aspect of the present invention, there is provided a non-transitory processor readable medium, comprising instructions for causing a processor to implement the method of the first aspect.

According to a third aspect of the present invention, there is provided a receiver comprising:

a receiver module for receiving a signal;

a processing module comprising a memory and a processor operatively coupled to the memory and configured to implement the method of the first aspect.

According to a fourth aspect of the present invention, there is provided a communication system comprising a transmitter and a receiver according to the third aspect, wherein the transmitter implements one or more M-ary phase shift keying digital modulation schemes and transmits a plurality of symbols comprising a plurality of pilot symbols known to the receiver, and a plurality of data symbols unknown to the receiver.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1:
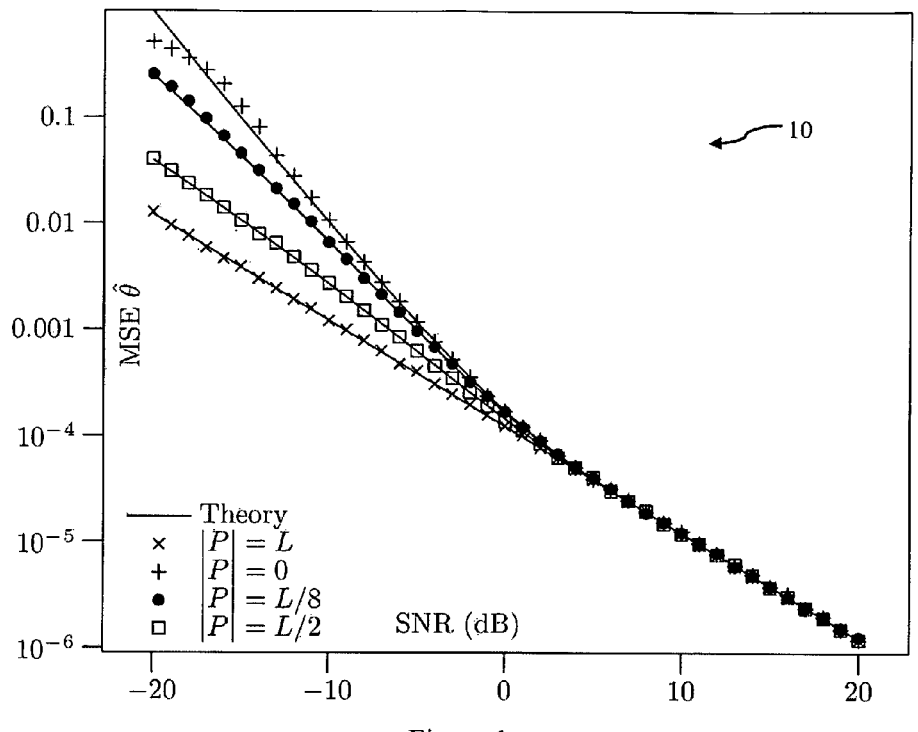
FIG. 1 is a plot of the Mean Square Error (MSE) of the phase estimator versus SNR for BPSK (M=2) with L=4096 symbols and varying proportions of pilot symbols according to an embodiment.

Embodiments of a method for estimating the carrier phase and amplitude in a received signal comprising a plurality of symbols modulated (or encoded) using one or more M-ary phase shift keying digital modulation schemes will now be described. The method considers the case where the plurality of transmitted symbols comprises both a plurality of pilot symbols known to the receiver and a plurality of data symbols unknown to the receiver. The method may be stored on a processor readable medium and implemented by a receiver in a communication system. Embodiments of the method use an efficient algorithm for optimised estimation (such as least-squares estimation) of the carrier phase and amplitude which exploits knowledge of pilot symbols (indexed by P) in addition to the unknown data portion of the received signal (indexed by D). For ease of understanding we will first consider the case of a single M-ary phase shift keying digital modulation scheme, in which all of the symbols are modulated according to the same modulation scheme. The method will then be extended to the case where a number of different constellation sizes are used simultaneously, such as communication systems employing unequal error protection.

One approach to estimation problems is to utilise optimisation techniques. Optimising techniques define an objective function which is then optimised (eg typically maximised or minimised) to obtain (or select) an estimate or value that represents an optimal solution. In some cases, sub-optimal solutions may be selected whether there is some advantage such as reduced execution time (eg if the sub-optimal solution is typically within a threshold of the optimal solution at some confidence level). One optimisation technique is least squares estimation. In the present case, we can define a sum of squares objective function:

$$SS(a, \{d_i, i \in D\}) = \sum_{i \in P \cup D} |y_i - as_i|^2 \sum_{i \in P \cup D} |y_i|^2 - as_i y_i^* - a^* s_i^* y_i + aa^*, \quad (6)$$

where * denotes the complex conjugate. Fixing the data symbols $\{d_i, i \in D\}$ and differentiating with respect to $a^*$, and setting the resulting equation to zero we find the least squares estimator of $a_0$ as a function of $\{d_i, i \in D\}$, $$\hat{a}(\{d_i, i \in D\}) = \frac{1}{L} \sum_{i \in P \cup D} y_i s_i^* = \frac{1}{L} Y \quad (7)$$

where L=|P∪D| is the total number of symbols transmitted, and to simplify our notation we have put $$Y = \sum_{i \in P \cup D} y_i s_i^* = \sum_{i \in P} y_i p_i^* + \sum_{i \in D} y_i d_i^*. \quad (8)$$

Note that Y is a function of the unknown data symbols $\{d_i, i \in D\}$ and we could write $Y(\{d_i, i \in D\})$, but have chosen to suppress the argument ($\{d_i, i \in D\}$) for notational clarity. Substituting $$\frac{1}{L} Y$$

for a into (6) we obtain SS optimised with respect to estimation of the carrier phase and amplitude a, $$SS(\{d_i, i \in D\}) = A - \frac{1}{L}|Y|^2, \quad (9).$$

where $A = \sum_{i \in P \cup D} |y_i|^2$ is a constant. In this case, the objective function is a sum of squares function and thus optimisation is in the form of minimisation of SS which from (9) amounts to finding the largest or maximum value of $|Y|^2$. We note that maximisation could be performed by a simple change of sign in the objective function. We will use the term optimisation to cover both minimisation and maximisation of an appropriate optimisation function. For the purpose of analysing computational complexity, we will assume that the number of data symbols |D| is proportional to the total number of symbols L, so that, for example, O(L)=O(|D|). Given candidate values for the data symbols, the corresponding SS($\{d_i, i \in D\}$) can be computed in O(L) arithmetic operations. For a set of candidate values for the data symbols, we will refer to Y as candidate sum value and $Q = |Y|^2$ as the candidate sum of squares value and observe that obtaining Q allows determining the full sum of squares term SS in (9) as L and A are constants. That is, the candidate sum value and candidate sum of squares value will refer to calculated values of Y in (8) and SS in (9) respectively, or suitable variations of those quantities which allow determination of those quantities (such as Q). That is, the candidate sum of squares value may be obtained from calculating the full term or some other term from which the full term can be calculated such as Q, or even some term that is correlated with the full term eg the term is proportional or functionally related to the full term to serve as a suitable proxy calculation for SS. For all candidate values we can note that due to the minus sign in (9), the largest candidate square sum value Q will be the sum of squares value that minimises the sum of squares SS.

There are at most H=M|D| candidate values of the least squares estimator (the objective function) of the data symbols. To see this, let $a = \rho e^{j\theta}$ where $\rho$ is a nonnegative real. Now, $$SS(\rho, \theta, \{d_i, i \in D\}) = \sum_{i \in P \cup D} |y_i - \rho e^{j\theta} s_i|^2 = \sum_{i \in P} |y_i - \rho e^{j\theta} p_i|^2 + \sum_{i \in D} |y_i - \rho e^{j\theta} d_i|^2. \quad (10)$$

For a given $\theta$ the least squares estimator of the $i$ th data symbol $d_i$ is given by minimising $|y_i - \rho e^{j\theta} d_i|^2$, that is, $$\hat{d}_i(\theta) = e^{j\hat{u}_i(\theta)} \text{ where } \hat{u}_i(\theta) = \lfloor \angle(e^{-j\theta} y_i) \rceil_{\frac{2\pi}{M}}, \quad (11)$$

where $\angle(\cdot)$ denotes the complex argument (or phase), and $$\lfloor \cdot \rceil_{\frac{2\pi}{M}}$$

rounds its argument to the nearest multiple of $2\pi/M$. The notation $\lfloor \cdot \rceil$ is often used to denote rounding to the nearest integer and to distinguish this case the subscript $2\pi/M$ has been added. That is, if the rounding function $\lfloor \cdot \rceil$ takes its argument to the nearest integer then, $$\lfloor x \rceil_{\frac{2\pi}{M}} = \frac{2\pi}{M} \left\lfloor \frac{M}{2\pi} x \right\rceil. \quad (12)$$

Note that $\hat{d}_i(\theta)$ does not depend on the amplitude $\rho$. As defined, $\hat{u}_i(\theta)$ is not strictly inside the set $$\left\{ 0, \frac{2\pi}{M}, \ldots, \frac{2\pi(M-1)}{M} \right\},$$

but this is not of consequence, as we intend its value to be considered equivalent modulo $2\pi$. With this in mind, we define the M-ary rounded phase offset:

$$\hat{u}_i(\theta) = \lfloor \angle y_i - \theta \rceil_{\frac{2\pi}{M}} \quad (13)$$

which is equivalent to the definition from (11) modulo $2\pi$.

We only need to consider $\theta$ in the interval $[0, 2\pi)$. Consider how $\hat{d}_i(\theta)$ changes as $\theta$ varies from 0 to $2\pi$. Let $b_i = \hat{d}_i(0)$ and define the M-ary rounded phase offset for the $i^{th}$ data symbol:

$$z_i = \angle y_i - \hat{u}_i(0) = \angle y_i - \lfloor \angle y_i \rceil_{\frac{2\pi}{M}}. \quad (14)$$

Then, $$\hat{d}_i(\theta) = \begin{cases} b_i, & 0 \leq \theta < z_i + \frac{\pi}{M} \\ b_i e^{-j2\pi/M}, & z_i + \frac{\pi}{M} \leq \theta < z_i + \frac{3\pi}{M} \\ \vdots & \\ b_i e^{-j2\pi k/M}, & z_i + \frac{\pi(2k-1)}{M} \leq \theta < z_i + \frac{\pi(2k+1)}{M} \\ \vdots & \\ b_i e^{-j2\pi} = b_i, & z_i + \frac{\pi(2M-1)}{M} \leq \theta < 2\pi \end{cases} \quad (15)$$

Let $$f(\theta) = \{\hat{d}_i(\theta), i \in D\} \quad (16)$$

be a function mapping the interval $[0, 2\pi)$ to a sequence of M-PSK symbols indexed by the elements of D. Observe that $f(\theta)$ is piecewise continuous. The subintervals of $[0, 2\pi)$ over which $f(\theta)$ remains constant are determined by the values of $\{z_i, i \in D\}$. Let $$S = \{f(\theta) | \theta \in [0, 2\pi)\} \quad (17)$$

be the set of all sequences $f(\theta)$ as $\theta$ varies from 0 to $2\pi$. If $\hat{\theta}$ is the least squares estimator of the phase then S contains the sequence $\{\hat{d}_i(\hat{\theta}), i \in D\}$ corresponding to the least squares estimator of the data symbols, ie, S contains the minimiser of (9). Observe from (15) that there are at most M|D| sequences in S, because there are M distinct values of $\hat{d}_i(\theta)$ for each $i \in D$.

The sequences in S can be enumerated as follows. Let $\sigma$ denote the permutation of the indices in D such that $z_{\sigma(i)}$ are in ascending order, that is, $$z_{\sigma(i)} \leq z_{\sigma(k)} \quad (18)$$

whenever $i < k$ where $i, k \in \{0, 1, \ldots, |D|-1\}$. It is convenient to define the indices into $\sigma$ to be taken modulo $|D|$, that is, if m is an integer not from $(0, 1, \ldots, |D|-1)$ then we define $\sigma(m) = \sigma(k)$ where $k \equiv m \mod |D|$ and $k \in \{0, 1, \ldots, |D|-1\}$. The first sequence in S is $$f_0 = f(0) = \{\hat{d}_i(0), i \in D\} = \{b_i, i \in D\}. \quad (19)$$

The next sequence $f_1$ is given by replacing the element $b_{\sigma(1)}$ in $f_0$ with $b_{\sigma(1)} e^{-j2\pi/M}$. Given a sequence $x$ we use $xe_i$ to denote $x$ with the $i$ th element replaced by $x_i e^{-j2\pi/M}$. Using this notation, $$f_1 = f_0 e_{\sigma(0)}. \quad (20)$$

The next sequence in S is correspondingly $$f_2 = f_0 e_{\sigma(0)} e_{\sigma(1)} = f_1 e_{\sigma(1)}, \quad (21)$$

and the $k$ th sequence is $$f_{k+1} = f_k e_{\sigma(k)}. \quad (22)$$

In this way, all M|D| sequences in S can be recursively enumerated.

We want to find the $f_k \in S$ corresponding to the minimiser of (9). One straight forward (or brute force) approach would be to compute $SS(f_k)$ for each $k \in \{0, 1, \ldots, M|D|-1\}$. Computing $SS(f_k)$ for any particular $k$ requires $O(L)$ arithmetic operations so this approach would require $O(LM|D|) = O(L^2)$ operations in total. However, as detailed below, it has been realised that $SS(f_k)$ can in fact be computed recursively reducing the number of operations required to $O(L \log L)$.

Let, $$SS(f_k) = A - \frac{1}{L} |Y_k|^2, \quad (23)$$

where, $$Y_k = Y(f_k) = \sum_{i \in P} y_i p_i^* + \sum_{i \in D} y_i f_{ki}^* = B + \sum_{i \in D} g_{ki}, \quad (24)$$

where $B = \sum_{i \in P} y_i p_i^*$ is a constant, independent of the data symbols, and $f_{ki}$ denotes the $i$ th symbol in sequence $f_k$, and for convenience, we put $g_{ki} = y_i f_{ki}^*$. Letting $g_k$ be the sequence $\{g_{ik}, i \in D\}$ we have, from (22), that $g_k$ satisfies the recursive equation $$g_{k+1} = g_k e^*_{\sigma}, \quad (25)$$

where $g_k e^*_{\sigma(k)}$ indicates the sequence $g_k$ with the $\sigma(k)$ th element replaced by $g_{k\sigma(k)} e^{j2\pi/M}$. Now, $$Y_0 = B + \sum_{i \in D} g_{0i} \qquad (26)$$

can be computed in O(L) operations, and $$Y_1 = B + \sum_{i \in D} g_{1i} \qquad (27)$$

$$= B + (e^{j2\pi/M} - 1)g_{0\sigma(0)} + \sum_{i \in D} g_{0i}$$

$$= Y_0 + \eta g_{0\sigma(0)},$$

where $\eta = e^{j2\pi/M} - 1$. This will be referred to as the replacement function or M-ary rotation increment. In general, $$Y_{k+1} = Y_k + \eta g_{k\sigma(k)}. \qquad (28)$$

That is, each candidate sum value $Y_k$ can be computed from its predecessor $Y_{k-1}$ in a constant number of operations, and given $Y_k$, the value of $SS(f_k)$ can be computed in a constant number of operations using (23). Let $\hat{k} = \arg\min SS(f_k)$. The least squares estimator of the complex amplitude is then computed according to (7), $$\hat{a} = \frac{1}{L} Y_{\hat{k}}. \qquad (29)$$

Pseudocode for an algorithm for least squares estimation of the carrier phase and amplitude with pilot and data symbols is provided in Table 1 below. Line 10 contains the function sort that, given $z = \{z_i, i \in D\}$, returns the permutation $\sigma$ as described in (18) and it returns the sorted order (it could equivalently be called sortindices). The sort function requires sorting $|D|$ elements and thus requires $O(L \log L)$ operations. The sort function is the primary bottleneck in this algorithm when L is large. The loops on lines 1 and 11 and the operations: on lines 6 to 9 all require O(L) or less operations.

TABLE 1

An algorithm for calculating a least squares estimator of the carrier phase and amplitude with pilot and data symbols according to an embodiment.

| Line | Step Performed | Comment |
|---|---|---|
| 0 | Input: $\{y_i, i \in P \cup D\}$ | Input is received noisy symbols |
| 1 | for $i \in D$ do | Loop over set of data symbols |
| 2 | $\phi = \angle y_i$ | Calculated phase (complex argument) of received data symbol |
| 3 | $u = \lfloor \phi \rceil_{\frac{2\pi}{M}}$ | Calculate M-ary rounded phase |
| 4 | $z_i = \phi - u$ | M-ary rounded phase offset for received data symbol |
| 5 | $g_i = y_i e^{-ju}$ | Used in calculation of candidate sum value |
| 6 | $Y = \Sigma_{i \in P} y_i p_i^* + \Sigma_{i \in D} g_i$ | First candidate sum value |
| 7 | $\hat{a} = \frac{1}{L} Y$ | Calculate first complex amplitude estimate from candidate sum value and set as least squares value |
| 8 | $\hat{Q} = |Y|^2$ | Calculate candidate sum of squares value and set as least squares sum of squares value. |
| 9 | $\eta = e^{j2\pi/M} - 1$ | Calculate replacement function (M-ary rotation increment) |
| 10 | $\sigma = \text{sort}(z)$ | Sort the set of rounded phase offsets from lowest to highest and store corresponding indices (ie sorted order) |
| 11 | for $k = 0$ to $M|D| - 1$ | Loop over set of candidate mapping sequences |
| 12 | $Y = Y + \eta g_{\sigma(k)}$ | Recursively obtain candidate sum value using sorted indices |
| 13 | $g_{\sigma(k)} = (\eta + 1) g_{\sigma(k)}$ | Recursively obtain next candidate value using sorted indices |
| 14 | $Q = |Y|^2$ | Calculate candidate sum of squares value |
| 15 | If $Q > \hat{Q}$ then | Test if calculated candidate sum of squares value exceeds least squares sum of squares value (largest value will minimise (9)) |
| 16 | $\hat{Q} = Q$ | Update least squares sum of squares value |
| 17 | $\hat{a} = \frac{1}{L} Y$ | Update least squares estimate of complex amplitude |
| 18 | Return $\hat{a}$ | Return least squares estimate of complex amplitude |

The sort function in step 10 may be performed using standard (efficient) sorting algorithms such as found in numerical libraries. Note that the sort function returns the sorted indices of the phase offsets (ie the positions of the symbols in D, or equivalently L), or otherwise allows the sorted indices to be determined. For example, the sort could sort the values, from which the indices could be obtained. In some embodiments, the sorting performed in step 10 could be performed as part of (ie integrated into) the loop of the data symbols in steps 1-5 so that the sorted order of M-ary rounded phase offsets is obtained upon completion of the loop. In this case, once the M-ary rounded phase offset for the $i^{th}$ received data symbol is obtained in step 4, the order of this value within the set of i-1 previously calculated values could be determined and stored. For example, a data structure such as an array, linked list, hierarchical tree, etc could be used to store the sorted indexes and once the $i^{th}$ value is obtained, the index i of the data symbol could be inserted into the appropriate location in this data structure.

Other variations of the algorithm shown in Table 1 are possible. In some embodiments, a stopping or early loop termination condition is added to loop steps 11 to 17 to save looping through the entire set of H=M|D| candidate mapping sequences. For example, a possible stopping criterion is if the candidate sum of squares value exceeds a predetermined threshold value. Whilst this may be a suboptimal value it may be sufficiently close for the estimation purposes and may further reduce the number of operations required. Such a threshold value could be obtained from simulations or other data, such as data from experimental trials or operational data. Further, in some embodiments, the exact terms calculated could be varied. We note that in steps 8 and 14, the value Q that is calculated is not actually the full sum of squares term (ie SS in (9)) but rather a value (or term) from which the full term may be calculated. In the above case, Q represents the varying or non-constant component of the full sum of squares term (SS in (9)) from which the full term can be calculated (for a given set of pilot symbols and total number of symbols L). Thus, in one embodiment, the candidate sum of squares value calculated in steps 8 and 14 could be the full term SS rather Q.

Monte Carlo simulations were performed to evaluate the performance of the least squares estimator. In all simulations the noise $w_1, \ldots, w_L$ is independent and identically distributed circularly symmetric and Gaussian with real and imaginary parts having variance $\sigma^2$. Under these conditions the least squares estimator is also the maximum likelihood estimator. Simulations were performed (run) with M=2, 4, 8 (BPSK and QPSK and 8-PSK) and with signal to noise ratio SNR=$\rho_0^2/2\sigma^2$ between −20 dB and 20 dB. The amplitude $\rho_0$=1 and $\theta_0$ is uniformly distributed on $[-\pi,\pi)$. For each value of SNR, T=5000 replications are performed to obtain T estimates $\hat{\rho}_1, \ldots, \hat{\rho}_T$ and $\hat{\theta}_1, \ldots, \hat{\theta}_T$.

Figure 2:
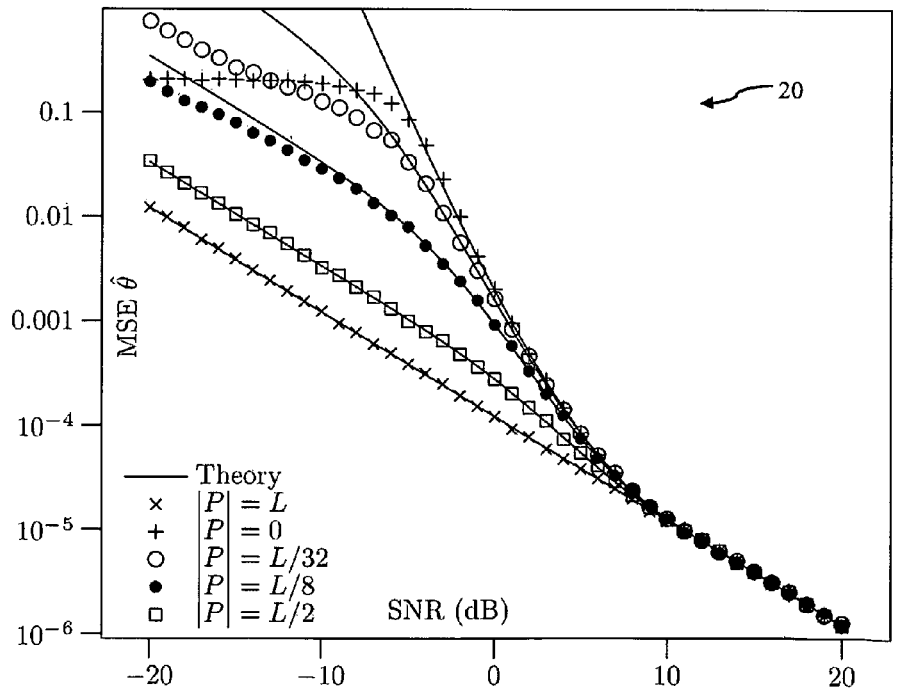
FIG. 2 is a plot of the Mean Square Error (MSE) of the phase estimator versus SNR for QPSK (M=4) with L=4096 symbols and varying proportions of pilot symbols according to an embodiment.
Figure 3:
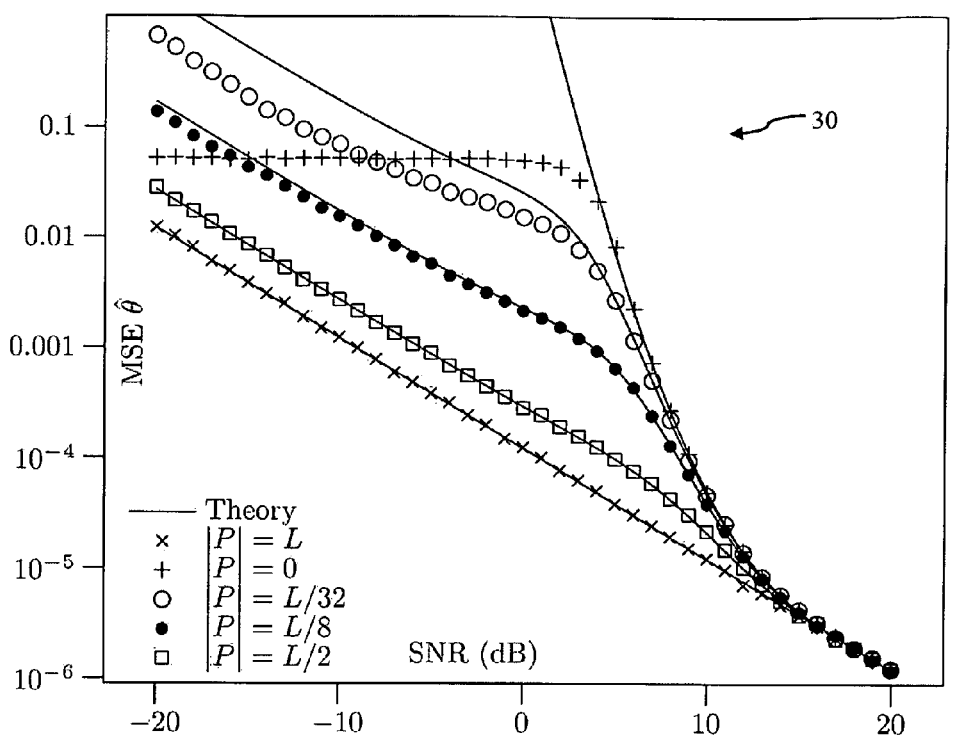
FIG. 3 is a plot of the Mean Square Error (MSE) of the phase estimator versus SNR for 8-PSK with L=4096 symbols and varying proportions of pilot symbols according to an embodiment.

FIGS. 1 to 3 show plots 10, 20, 30, of the mean square error (MSE) of the phase estimator when M=2, 4, 8 respectively with L=4096 and for varying proportions of pilots symbols $$|P| = 0, \frac{L}{32}, \frac{L}{8}, \frac{L}{2}, L,$$

illustrated using plus (+), open circles (○), filled circles (•), open square (□) and cross (x) symbols respectively. That is, the plus (+) represents the non-coherent reference case. The dots, squares, circles and crosses are the results of Monte-Carlo simulations with the least square estimator. The solid lines are the MSEs predicted based on a theoretical result not described here. FIGS. 1 to 3 each show that the estimator described herein, which exploits pilot symbols in addition to the unknown data symbols, significantly outperforms the non-coherent case (plus +) over a wide range of relevant signal to noise ratios.

Figure 4:
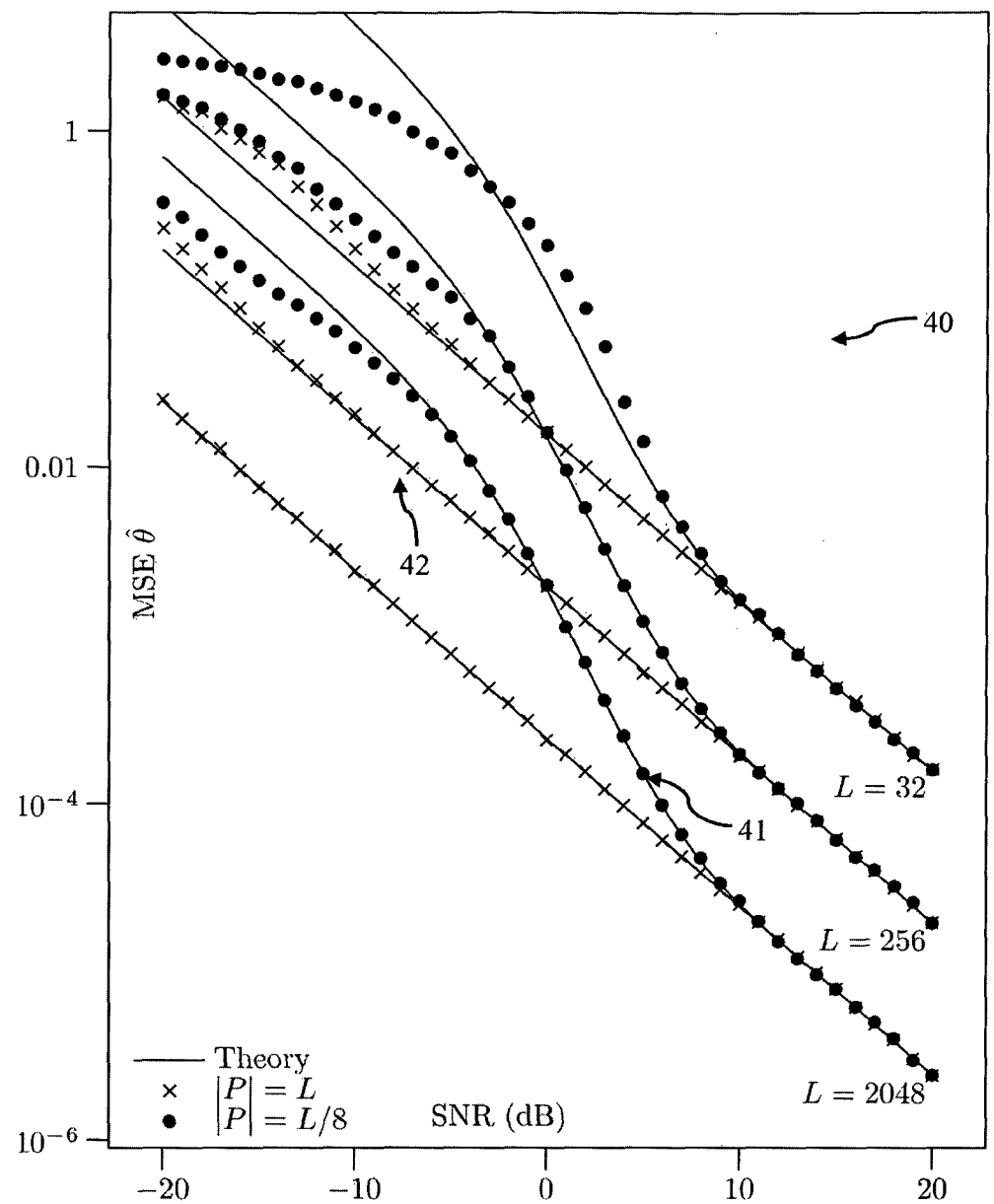
FIG. 4 is a plot of the Mean Square Error (MSE) of the phase estimator versus SNR for QPSK (M=4) with varying number of symbols L=(32, 256, 2048) and varying proportions of pilot symbols according to an embodiment.

FIG. 4 shows the MSE of the phase estimator when M=4 and L=32, 256, 2648 and the number of pilots is $$|P| = \frac{L}{8}, L,$$

illustrated using mica circles (•) 42 and cross (x) 41 symbols respectively (for each value of L, subscripts a, b, c). The figure depicts an interesting phenomenon. When L=2048 and $$|P| = \frac{L}{8} = 256$$

the number of pilots symbols is the same as when L=|P|=256. When the SNR is small (approximately less than 0 dB) the least squares estimator using the 256 pilot symbols and also the 2048−256=1792 data, symbols 41 performs worse than the estimator that uses only the 256 pilot symbols (and no data symbols) 42. A similar phenomenon occurs when L=256 and $$|P| = \frac{L}{8} = 32.$$

This behaviour suggests modifying the objective function to give the pilots symbols more importance when the SNR is low. For example, rather the minimise (4) we could instead minimise a weighted version of it, $$SS_\beta(a, \{d_i, i \in D\}) = \sum_{i \in P} |y_i - as_i|^2 + \beta \sum_{i \in D} |y_i - ad_i|^2, \quad (30)$$

where the weight β would be small when SNR is small and near 1 when SNR is large. The optimal value of β for different values of SNR may be readily determined, by computer simulation. Computing the â that minimises $SS_\beta$ can be achieved with only a minor modification to the algorithm shown in Table 1. Line 5 is modified to $$g_i = \beta y_i e^{-ju} \quad (31)$$

and lines 7 and 17 are modified to $$\hat{a} = \frac{1}{|P| + \beta|D|} Y. \quad (32)$$

The above embodiments have considered the case when all L symbols are modulated using a single M-ary phase shift keying digital modulation scheme. We will now relax this limitation and extend the above algorithm to the case where multiple different constellation sizes are used simultaneously. This scenario is common in practical communications systems employing what is called unequal error protection, in which some symbols are deemed more important than others.

The total number of symbols transmitted is L=|P∪D| where the sets P and D are disjoint, ie P∩D=∅. The data symbols D are further separated into subsets according to the size of the constellation used to modulate each symbol. Let $D_2, D_3, \ldots$ denote a partition of the indices in D such that $D_2$ is the set of indices corresponding to data symbols modulated with 2-PSK (ie BSPK), and $D_3$ is the set of symbols modulated with 3-PSK, and $D_4$ is the set of symbols modulated with 4-PSK (ie QPSK) and so on. Let G be the set of integers for which $D_m$ is not empty, ie $|D_m|>0$ if, and only if, m∈G(|$D_m$| is the number of data symbols modulated according to the $m^{th}$ modulation scheme). We have $$D = \bigcup_{m=2}^{\infty} D_m = \bigcup_{m \in G} D_m. \quad (33)$$

In practical settings the number of different constellations used |G| is typically small. A practical example might be that BPSK is used for important symbols and QPSK is used for less important symbols. In this example G={2,4} and |G|=2.

We proceed as outlined above by beginning by defining a sum of squares based objective function (equation (6)) and obtaining the set of sequences S according to equation (17). Equivalent equations are derived by replacing M (single modulation scheme case) with m, where m corresponds to the respective modulation scheme used for a symbol (or equivalently adding a subscript $M_m$ to designate the appropriate modulation scheme for a symbol). For example, the rounding in equations (11)(13)(12) is performed by rounding to the nearest multiple of $2\pi/m$ where m is the modulation scheme for the symbol being rounded (ie the M-ary rounded phase offsets are each rounded with respect to corresponding modulation scheme for the symbol the phase offset is being calculated for). We note from (15) that there are at most $$H = \sum_{m \in G} m|D_m| = O(L)$$

sequences in S, because there are m distinct values of $\hat{d}_i(\theta)$.

In the case of a multiple M-ary phase shift keying digital modulation schemes, the set of all sequences in S can be enumerated as follows. Let $$T = \bigcup_{m \in G} \bigcup_{i \in D_m} \bigcup_{k=1}^{m} \left\{ \left( z_i + \frac{\pi(2k-1)}{m}, i, m \right) \right\} \quad (34)$$

be a set of triples with first element a real number, second element from D and third element from G. The number of elements in T is H=|T|=O(L). Let $t_1, \ldots, t_H$ be an enumeration of the triples from T sorted in ascending order of the first element in the triple, that is $t_k=(t_{k1},t_{k2},t_{k3})$ then $t_{i1} \leq t_{k1}$ whenever i<k. We put $\sigma(k)=t_{k2}$ and $m(k)=t_{k3}$ so that $\sigma(1), \ldots, \sigma(H)$ and $m(1), \ldots, m(H)$ correspond respectively with the second and third elements from the triples $t_1, \ldots, t_H$.

The sequences in S can be recursively enumerated as outlined above in equations (19)-(22) above (replacing M with m for the respective modulation scheme) and we wish to find the $f_k \in S$ corresponding to the minimiser of (9). One straight forward (or brute force) approach would be to compute $SS(f_k)$ for each $k \in \{0, 1, \ldots, H\}$. However, as computing $SS(f_k)$ for any particular k requires O(L) arithmetic operations, this approach would require $O(LH)=O(L^2)$ operations in total. Hence, as detailed above, we compute $SS(f_k)$ recursively to reduce the number of operations required to O(L log L). As before each candidate sum value $Y_k$ is computed from its predecessor $Y_{k-1}$ in a constant number of operations $(Y_{k+1}=Y_k+(e^{j2\pi/m(k)}-1)g_{k\sigma(k)})$, and given $Y_k$, the value of $SS(f_k)$ can be computed in a constant number, of operations using (23). If we let $\hat{k}=\arg\min_{k \in \{1, \ldots, H\}} SS(f_k)$ then the least squares estimator of the complex amplitude is again computed according to equation (29). The algorithm in Table 1 is modified as outlined in Table 2 below. The function sort on line 14 returns the triples $t_1, \ldots, t_H$ so that the first element is in ascending order (it could equivalently be called sorttriples). This requires O(H log H)=O(L log L) operations and the sort function is the primary bottleneck in this algorithm when L is large. As discussed in relation to Table 1, other variations of the algorithm shown in Table 2 are also possible.

Monte-Carlo simulations with the least squares estimator outlined above and calculated using the algorithm presented in Table 2 above were performed for a system using multiple modulation schemes. In the simulations the noise $w_1, \ldots, w_L$, is independent and identically distributed circularly symmetric and Gaussian with real and imaginary parts having variance $\sigma^2$. Under these conditions, the least squares estimator is also the maximum likelihood estimator. Simulations were run with G={2,4} (BPSK and QPSK symbols) and pilot symbols and with signal to noise ratio SNR=$\rho_0^2/2\sigma^2$ between −20 dB and 20 dB. The amplitude $\rho_0=1$ and $\theta_0$ is uniformly distributed on $\{-\pi,\pi\}$. For each value of SNR, T=5000 replications are performed to obtain T estimates $\hat{\rho}_1, \ldots, \hat{\rho}_T$ and $\hat{\theta}_1, \ldots, \hat{\theta}_T$.

TABLE 2

An algorithm for calculating a least squares estimator of the carrier phase and amplitude with pilot and data symbols for multiple M-ary phase shift keying digital modulation schemes.

| Line | Step Performed | Comment |
|---|---|---|
| 0 | Input: $\{y_i, i \in P \cup D\}$ | Input is received noisy symbols |
| 1 | c = 1 | Counter variable |
| 2 | for m $\in$ G do | Loop over the modulation schemes m |
| 3 | \| for i $\in D_m$ do | Loop over set of data symbols in modulation scheme m |
| 4 | \| \| $\phi = \angle y_i$ | Calculate phase (complex argument) of received data symbol |
| 5 | \| \| $u = \lfloor \phi \rceil_{\frac{2\pi}{m}}$ | Calculate M-ary rounded phase for modulation scheme m |
| 6 | \| \| $z_i = \phi - u$ | M-ary rounded phase offset for received data symbol |
| 7 | \| \| $g_i = y_i e^{-ju}$ | Used in calculation of candidate sum value |
| 8 | \| \| for k = 1, . . . , m do | Loop over indices for current modulation scheme m |
| 9 | \| \| \| $t_c = \left(z + \frac{\pi(2k-1)}{m}, i, m\right)$ | Calculate elements of triple T (equation (34)) for sorting |
| 10 | \| \| \| c = c + 1 | Increment counter |
| 11 | $Y = \Sigma_{i \in P} y_i p_i^* + \Sigma_{i \in D} g_i$ | First candidate sum value |
| 12 | $\hat{a} = \frac{1}{L} Y$ | Calculate first complex amplitude estimate from candidate sum value and set as least squares value |

TABLE 2-continued

An algorithm for calculating a least squares estimator of the carrier phase and amplitude with pilot and data symbols for multiple M-ary phase shift keying digital modulation schemes.

| Line | Step Performed | Comment |
|---|---|---|
| 13 | $\hat{Q} = |Y|^2$ | Calculate candidate sum of squares value and set as least squares sum of squares value. |
| 14 | $\text{sort}(t_1, \ldots, t_H)$ | Sort the set of rounded phase offsets triples from lowest to highest using first element of triple and store corresponding indices (ie sorted order) |
| 15 | for $1, \ldots, H$ do | Loop over set of candidate mapping sequences |
| 16 | $\quad Y = Y + (e^{j2\pi/m(k)} - 1)g_{\sigma(k)}$ | Recursively obtain candidate sum value using sorted indices |
| 17 | $\quad g_{\sigma(k)} = e^{j2\pi/m(k)} g_{\sigma(k)}$ | Recursively obtain next candidate value using sorted indices |
| 18 | $\quad Q = |Y|^2$ | Calculate candidate sum of squares value |
| 19 | $\quad$ If $Q > \hat{Q}$ then | Test if calculated candidate sum of squares value exceeds least squares sum of squares value |
| 20 | $\quad\quad \hat{Q} = Q$ | Update least squares sum of squares value |
| 21 | $\quad\quad \hat{a} = (1/L)Y$ | Update least squares estimate of complex amplitude |
| 22 | Return $\hat{a}$ | Return least squares estimate of complex amplitude |

Figure 5:
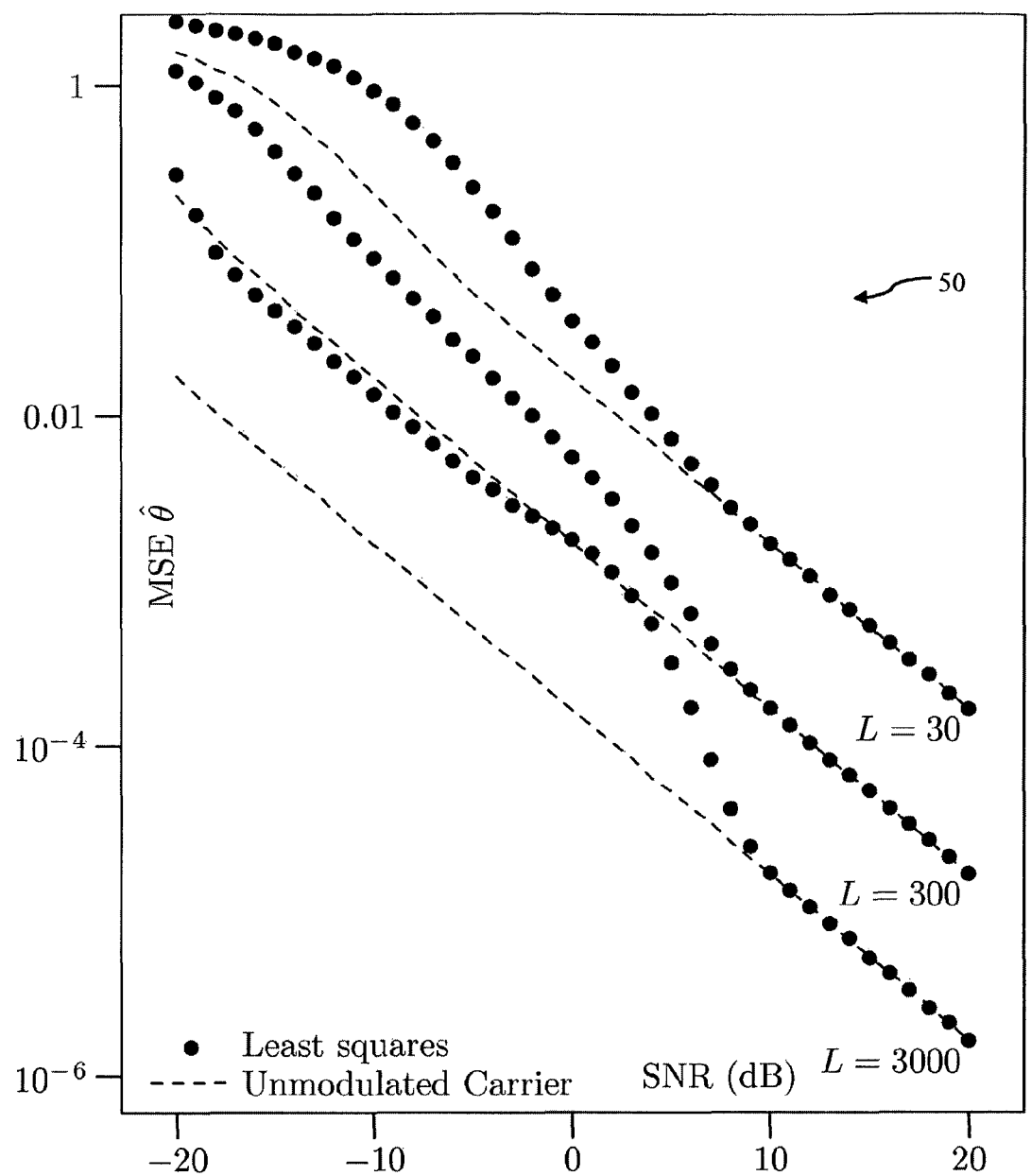
FIG. 5 is a plot of the Mean Square Error (MSE) of the phase estimator versus SNR for a system using multiple modulation schemes for varying number of symbols L (30, 300, 3000) and with one third of the symbols being pilot symbols, one third of the symbols being BPSK symbols and one third of the symbols being QPSK symbols according to an embodiment.

FIG. 5 shows plots 50 of the mean square error (MSE) of the phase estimator versus SNR for a system using multiple modulation schemes. The total number of symbols was varied with L=30,300 and 3000. In each case there are L/3 pilot symbols, L/3 BPSK symbols and L/3 QPSK symbols. The dots show the sample MSE of the least squares estimator. The dashed line is the sample MSE of the unmodulated carrier estimator, that is, the estimator that results when all symbols are known a-priory at the receiver, ie, all symbols are pilot symbol.

Figure 6:
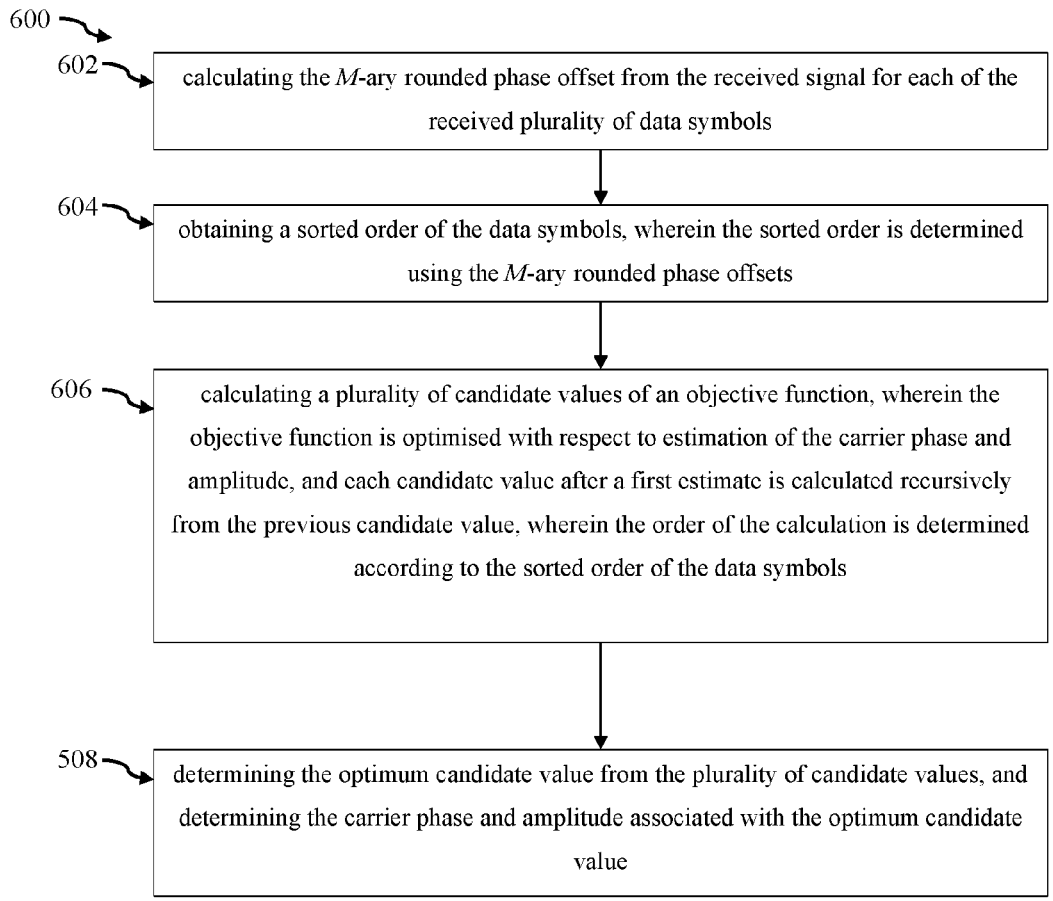
FIG. 6 is a flowchart of an embodiment of a method for estimating the carrier phase and amplitude in a received signal according to an embodiment.

Embodiments of a method for estimating the carrier phase and amplitude in a received signal, comprising a plurality of symbols modulated (or encoded), using one or more M-ary phase shift keying digital modulation schemes have been discussed. The method considers the case where the plurality of transmitted symbols comprises both a plurality of pilot symbols known to the receiver and a plurality of data symbols unknown to the receiver. FIG. 6 illustrates a flow chart 600 of a method for estimating the carrier phase and amplitude in a received signal comprising a plurality of symbols modulated (or encoded) using one or more M-ary phase shift keying digital modulation schemes according to an embodiment. The method comprises the steps of:

calculating the M-ary rounded phase offset from the received signal for each of the received plurality of data symbols 602;

obtaining a sorted order of the data symbols, wherein the sorted order is determined using the M-ary rounded phase offsets 604;

calculating a plurality of candidate values of an objective function, wherein the objective function is optimised with respect to estimation of the carrier phase and amplitude, and each candidate value after a first estimate is calculated recursively from the previous candidate value, wherein the order of the calculation is determined according to the sorted order of the data symbols 606; and determining the optimum candidate value from the plurality of candidate values, and determining the carrier phase and amplitude associated with the optimum candidate value 608.

Embodiments of the above method provide an improved algorithm for optimal estimation (using a least squares estimator) of the carrier phase and amplitude which exploits knowledge of pilot symbols (indexed by P) in addition to the unknown data portion of the received signal (indexed by D). In some embodiments, the method may be implemented using the algorithms shown in Table 1 or 2. The M-ary rounded phase offset calculated in step 602 are calculated according to the appropriate modulation scheme for the symbol. Embodiments of the method utilise recursion to calculate (or computer) candidate estimates and only require O(L log L) arithmetic operations, where L is the number of received symbols and is thus an efficient estimation method. The plurality of candidate values of an objective function calculated in step 606 above correspond with a plurality of candidate estimates of the carrier phase and amplitude. Thus, calculating the candidate value of the objective function, and selecting an optimum value allows a corresponding optimum estimates of the carrier phase and amplitude to be obtained (ie calculated or determined).

In some embodiments, the determining step 608 is performed as the plurality of candidate values are calculated in step 606. In one embodiment, as each candidate value of the objective function is obtained, corresponding candidate estimates (or values) of the carrier phase and amplitude (the complex amplitude) are calculated (or determined) and stored. In another embodiment (such as that illustrated in Table 1), as each of the plurality of candidate estimates is calculated it is compared with current optimum candidate value. If the candidate value is an improvement, (ie more optimal) than the current optimal value, then the previous best values for the candidate value is replaced and the carrier phase and amplitude are calculated and stored as (best) estimates. In other embodiments, the determining step 608 is performed after the calculation step 606. In this case, the plurality of candidate values are stored in a matrix, vector, tree, hash, or other data structure. The optimum value could then be obtained from the full set of candidate values, and he corresponding carrier phase and amplitude for this optimum value could then be determined. Alternatively, the corresponding carrier phase and amplitude for each of the plurality of candidate estimates could also be calculated and stored when they are calculated, and once the optimum candidate value is selected, the corresponding carrier phase and amplitude could be determined by looking up the corresponding stored values.

The objective function may be a sum of squares function, eg (9), and the candidate sum of squares value may be obtained from calculating the full term or some other term from which the full term can be calculated such as Q (the non-constant or varying component in the full term), or even some term that is correlated with the full term, eg the term is proportional or functionally related to the full term to serve as a suitable proxy calculation. The optimum may be the minimum sum of squares value. As outlined in Table 1, a carrier phase and amplitude can be calculated for each candidate value and these can be associated in a memory with the candidate value. For example, in Table 1, as each improved optimum value of Q is obtained, the associated carrier phase and amplitude is also calculated (or estimated). Further, a stopping criterion may be used in which case the plurality of candidate values need not be the full set of possible candidate values (H=M|D| or H=|T| in the multi-modulation scheme case). In this case, the optimum value need not be a global optimum. In other embodiments the optimum, value may simply be a good or acceptable value based on some threshold or criteria, such as an indication of convergence such as decreasing change between current and previous optimum values (ie further calculations are only likely to increase the precision and not the accuracy of the estimate of the optimum value).

Figure 7:
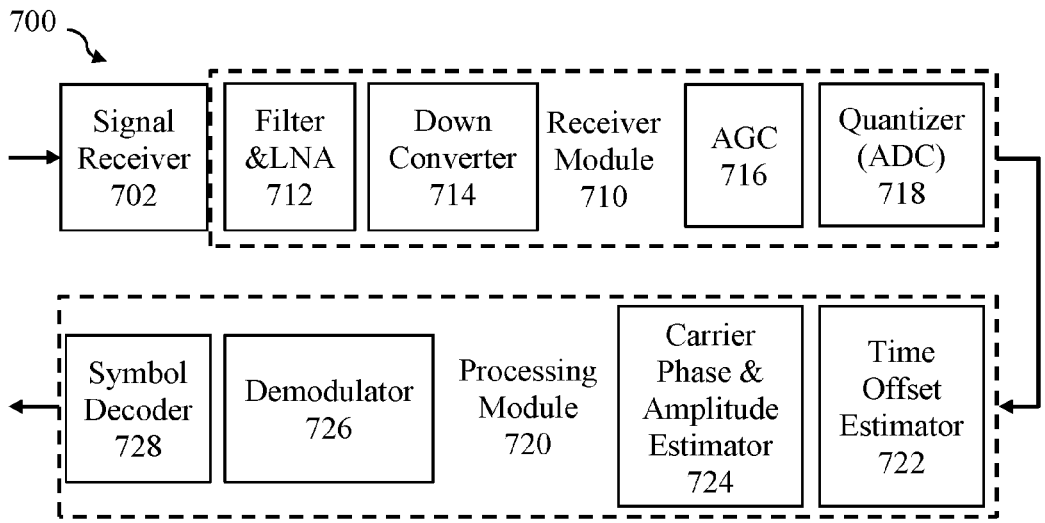
FIG. 7 is a block diagram of a receiver according to an embodiment.

A receiver and an associated communication system (further comprising a transmitter) which implement embodiments of the method described herein can also be provided. The communication system may be a wired or wireless communication system. FIG. 7 is a block diagram 700 of a receiver which implements the above described algorithm. The receiver comprises a receiver module 710 and a processing module 720. The receiver module comprises a signal receiving module 702 such as input port in a wired implementation or an antenna in a wireless implementation. The receiver module 710 receives a transmitted signal and prepares the signal for signal processing tasks performed by the (baseband) processing module. In the case of a wireless receiver, the receiver module 710 (the RF front end in the case of RF wireless communications) comprises modules for performing tasks such as filtering and low noise amplification 712, down-conversion to baseband frequencies 714, automatic gain control (AGC) 716 and quantisation (eg using an Analog to Digital Converter or ADC) of the received signal 718 to produce a base band signal. The (baseband) processing module 720 receives the base band signal and performs a range of signal processing tasks to generate estimates of the transmitted bit stream. The baseband processing can be implemented in application specific integrated circuits (ASICs), digital signal processors (DSPs), digital signal processing devices (DSPDs), programmable logic devices (PLDs), field programmable gate arrays (FPGAs), processors, controllers, etc and comprises modules for performing time offset (delay) estimation 722, carrier phase and amplitude estimation 724, demodulation 726, and symbol decoding 728. The carrier phase and amplitude estimation module is configured to implement embodiments of the method described herein, such as the algorithms shown in Table 1 and Table 2.

Other receiver embodiments and arrangements are possible, including software defined radio implementations. Further, in one embodiment the method is stored as instructions in a non-transitory processor readable medium (eg hard disk, Flash memory, optical disk (CDROM, DVD), etc) for causing a processor to implement the method. The methods and receivers may be utilised in communication systems and components such as those described in the following co-pending PCT applications:

PCT/AUAU2013/000888 titled "System for Analog to Digital Conversion" filed on 13 Aug. 2013;

PCT/AU2013/000895 titled "Channel Allocation in a Communication System" filed on 14 Aug. 2013;

PCT/AU2013/001078 titled "Communication system and method" filed on 20 Sep. 2013; and PCT/AU2013/001079 titled "Multi-access Communication System" filed on 20 Sep. 2013. The content of each of these applications is hereby incorporated by reference in their entirety.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. A central processing unit (CPU) may be used, containing an Input/Output Interface, an Arithmetic and Logic Unit (ALU) and a Control Unit and Program Counter element which is in communication with input and output devices or modules through the Input/Output Interface, and a memory. Software modules, also known as computer programs, computer codes, or instructions, may contain a number a number of source code or object code segments or instructions, and may reside in any computer or processor readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

The reference to any prior art in this specification is not, and should not be taken as, an acknowledgement of any form of suggestion that such prior art forms part of the common general knowledge, or is well known in the field.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention.

The invention claimed is:

1. A method for estimating the carrier phase and amplitude in a received signal by a receiver including hardware components, comprising:
   receiving, by the receiver, a signal comprising a plurality of symbols modulated using one or more M-ary phase shift keying digital modulation schemes, the plurality of symbols comprising a plurality of pilot symbols known to the receiver, and a plurality of data symbols unknown to the receiver;
   calculating the M-ary rounded phase offset from the received signal for each one of the received plurality of data symbols;
   obtaining a sorted order of the data symbols, wherein the sorted order is determined using the M-ary rounded phase offsets;
   calculating a plurality of candidate values of an objective function, wherein the objective function is optimised with respect to estimation of the carrier phase and amplitude, and each candidate value after a first candidate estimate is calculated recursively from the previous candidate value, wherein the order of the calculation is determined according to the sorted order of the data symbols; and
   determining an optimum candidate value from the plurality of candidate values, and determining the carrier phase and amplitude associated with the optimum candidate value.

2. The method as claimed in claim 1, wherein the sorted order is an ascending order of the M-ary rounded phase offsets.

3. The method as claimed in claim 1, wherein the objective function is a sum of squares function.

4. The method as claimed in claim 3, wherein the sum of squares function is minimised with respect to estimation of the carrier phase and amplitude.

5. The method as claimed in claim 3, wherein the number of modulation schemes is |G| and $$H = \sum_{m \in G} m|D_m| = O(L)$$

candidate sum or squares values are calculated, where $|D_m|$ is the number of data symbols in the received signal modulated according to the $m^{th}$ modulation scheme and $D_m$ is the set of indices describing the positions of symbols modulated with the $m^{th}$ modulation scheme.

6. The method as claimed in claim 5, wherein the sum of squares value is a weighted sum of squares value.

7. The method as claimed in claim 6, wherein the weighting is based upon a Signal to Noise Ratio (SNR) to give more importance to pilot symbols when the SNR is low.

8. The method as claimed in claim 1, wherein the step of determining an optimum candidate value from the plurality of candidate values is performed as the plurality of candidate values are calculated.

9. The method as claimed in claim 8, wherein as each candidate value is calculated it is compared with a current optimum candidate value, and if the calculated candidate value is optimal compared to the current optimum candidate value, the current optimum candidate value is updated with the calculated candidate value.

10. The method as claimed in claim 9, wherein if the current optimum candidate value is updated, a corresponding carrier phase and an amplitude value is calculated.

11. The method as claimed in claim 1, wherein the plurality of symbols are modulated using a single M-ary phase shift keying digital modulation scheme.

12. The method as claimed in claim 1, wherein the plurality of symbols are modulated using a two or more M-ary phase shift keying digital modulation schemes.

13. A non-transitory processor readable medium, comprising instructions for causing a processor to carry out a method for estimating the carrier phase and amplitude in a received signal by a receiver including hardware components, comprising:
   receiving, by the receiver, a signal comprising a plurality of symbols modulated using one or more M-ary phase shift keying digital modulation schemes, the plurality of symbols comprising a plurality of pilot symbols known to the receiver, and a plurality of data symbols unknown to the receiver;
   calculating the M-ary rounded phase offset from the received signal for each one of the received plurality of data symbols;
   obtaining a sorted order of the data symbols, wherein the sorted order is determined using the M-ary rounded phase offsets;
   calculating a plurality of candidate values of an objective function, wherein the objective function is optimised with respect to estimation of the carrier phase and amplitude, and each candidate value after a first candidate estimate is calculated recursively from the previous candidate value, wherein the order of the calculation is determined according to the sorted order of the data symbols; and
   determining an optimum candidate value from the plurality of candidate values, and determining the carrier phase and amplitude associated with the optimum candidate value.

14. A receiver comprising:
   a receiver module for receiving a signal, the receiver module including receiver hardware components; and
   a processing module including processing hardware components, the processing module comprising a memory and a processor operatively coupled to the memory and configured to carry out a method for estimating the carrier phase and amplitude in a received signal by the receiver, the method comprising:
   receiving a signal comprising a plurality of symbols modulated using one or more M-ary phase shift keying digital modulation schemes, the plurality of symbols comprising a plurality of pilot symbols known to the receiver, and a plurality of data symbols unknown to the receiver;
   calculating the M-ary rounded phase offset from the received signal for each one of the received plurality of data symbols;

obtaining a sorted order of the data symbols, wherein the sorted order is determined using the M-ary rounded phase offsets;

calculating a plurality of candidate values of an objective function, wherein the objective function is optimised with respect to estimation of the carrier phase and amplitude, and each candidate value after a first candidate estimate is calculated recursively from the previous candidate value, wherein the order of the calculation is determined according to the sorted order of the data symbols; and determining an optimum candidate value from the plurality of candidate values, and determining the carrier phase and amplitude associated with the optimum candidate value.

15. A communication system comprising:

a transmitter including transmitter hardware components; and a receiver including receiver hardware components, the receiver comprising:

a receiver module for receiving a signal;

a processing module comprising a memory and a processor operatively coupled to the memory and configured to carry out a method for estimating the carrier phase and amplitude in a received signal by the receiver comprising:

receiving a signal comprising a plurality of symbols modulated using one or more M-ary phase shift keying digital modulation schemes, the plurality of symbols comprising a plurality of pilot symbols known to the receiver, and a plurality of data symbols unknown to the receiver;

calculating the M-ary rounded phase offset from the received signal for each one of the received plurality of data symbols;

obtaining a sorted order of the data symbols, wherein the sorted order is determined using the M-ary rounded phase offsets;

calculating a plurality of candidate values of an objective function, wherein the objective function is optimised with respect to estimation of the carrier phase and amplitude, and each candidate value after a first candidate estimate is calculated recursively from the previous candidate value, wherein the order of the calculation is determined according to the sorted order of the data symbols; and determining an optimum candidate value from the plurality of candidate values, and determining the carrier phase and amplitude associated with the optimum candidate value;

wherein the transmitter is configured to implement said one or more M-ary phase shift keying digital modulation schemes and transmits said plurality of symbols comprising the plurality of pilot symbols known to the receiver, and the plurality of data symbols unknown to the receiver.

* * * * *

UNITED STATES PATENT AND TRADEMARK OFFICE
CERTIFICATE OF CORRECTION

PATENT NO. : 9,491,018 B2  
APPLICATION NO. : 14/651941  
DATED : November 8, 2016  
INVENTOR(S) : William George Cowley et al.

Page 1 of 1

It is certified that error appears in the above-identified patent and that said Letters Patent is hereby corrected as shown below:

On the Title Page

At item (72), the Inventors are listed incorrectly.

Please delete "Andre Polok, Adelaide (AU)" and replace it with --Andre Pollok, Adelaide (AU)--.

Signed and Sealed this
Fourteenth Day of February, 2017

Michelle K. Lee
*Director of the United States Patent and Trademark Office*